US006836036B2

(12) United States Patent
Dubé

(10) Patent No.: US 6,836,036 B2
(45) Date of Patent: Dec. 28, 2004

(54) ELECTRIC MOTOR WITH MODULAR STATOR RING AND IMPROVED HEAT DISSIPATION

(76) Inventor: Jean-Yves Dubé, 43, rue Fortin, Asbestor, Québec (CA), J1T 4E5

( * ) Notice: Subject to any disclaimer, the term of this patent is extended or adjusted under 35 U.S.C. 154(b) by 313 days.

(21) Appl. No.: 10/170,357

(22) Filed: Jun. 14, 2002

(65) Prior Publication Data
US 2004/0160141 A1 Aug. 19, 2004

(51) Int. Cl.$^7$ .............................................. H02K 1/32
(52) U.S. Cl. ...................... 310/64; 310/67 R; 310/68 R; 180/65.5
(58) Field of Search ................................ 310/64, 67 R, 310/68 R; 180/65.5

(56) References Cited
U.S. PATENT DOCUMENTS

| | | | | |
|---|---|---|---|---|
| 3,539,848 A | * | 11/1970 | Dosch et al. ................. | 310/64 |
| 4,144,932 A | * | 3/1979 | Voigt .......................... | 165/80.3 |
| 4,840,222 A | * | 6/1989 | Lakin et al. ................. | 165/47 |
| 5,600,191 A | * | 2/1997 | Yang ......................... | 310/67 R |
| 5,793,132 A | * | 8/1998 | Hirose et al. ................. | 310/71 |
| 5,915,493 A | * | 6/1999 | Nakayama .................. | 180/206 |
| 6,031,306 A | * | 2/2000 | Permuy ...................... | 310/67 R |
| 6,175,171 B1 | * | 1/2001 | Rupp et al. ................... | 310/52 |
| 6,321,863 B1 | * | 11/2001 | Vanjani ...................... | 180/65.5 |

FOREIGN PATENT DOCUMENTS

| | | | | |
|---|---|---|---|---|
| EP | 695662 A1 | * | 2/1996 | ............ B60K/7/00 |
| JP | 10313565 A | * | 11/1998 | .......... H02K/29/00 |

* cited by examiner

Primary Examiner—Joseph Waks
(74) Attorney, Agent, or Firm—Oqilvy Renault; Guy J. Houle

(57) ABSTRACT

A stator ring for an electric motor, the stator ring comprising plural stator ring sections being molded of insulated ferromagnetic powder. The stator ring sections each have an arcuate shoe having a plurality of teeth projecting radially therefrom. The teeth are adapted for receiving coil windings. The stator ring sections are adapted for being retained end to end by a stator core to form a complete stator ring. The arcuate shoes of the stator ring sections create expansion gaps between opposite ends thereof when the stator core and the stator ring sections are subjected to heat expansion, to prevent damage of the stator ring due to the heat expansion. The stator core is also constituted with improved heat dissipation and adapted to mount an electronic circuit board with some of its components in direct heat conductivity with the core. Heat is dissipated by radiation, convection and ventilation.

14 Claims, 6 Drawing Sheets

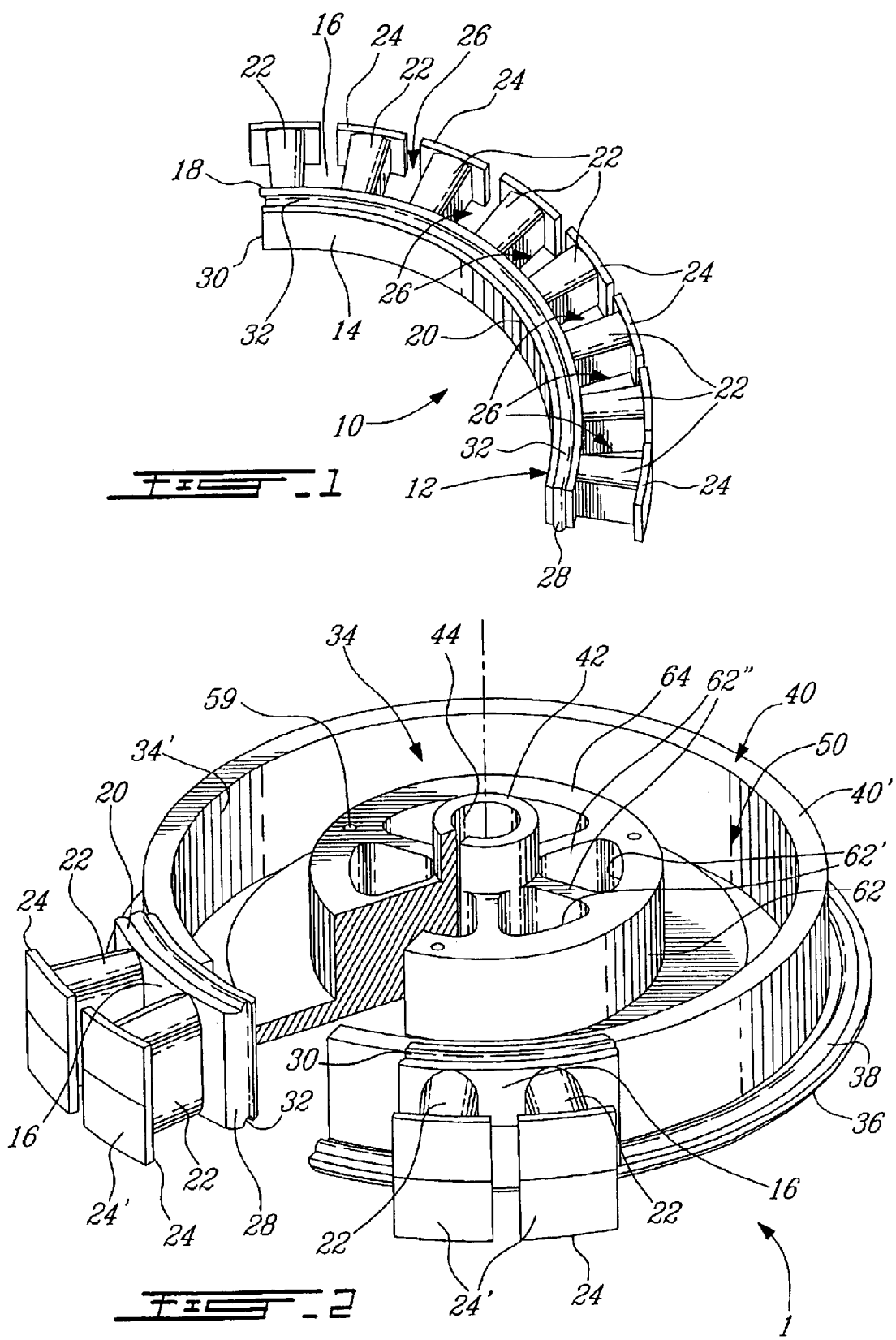

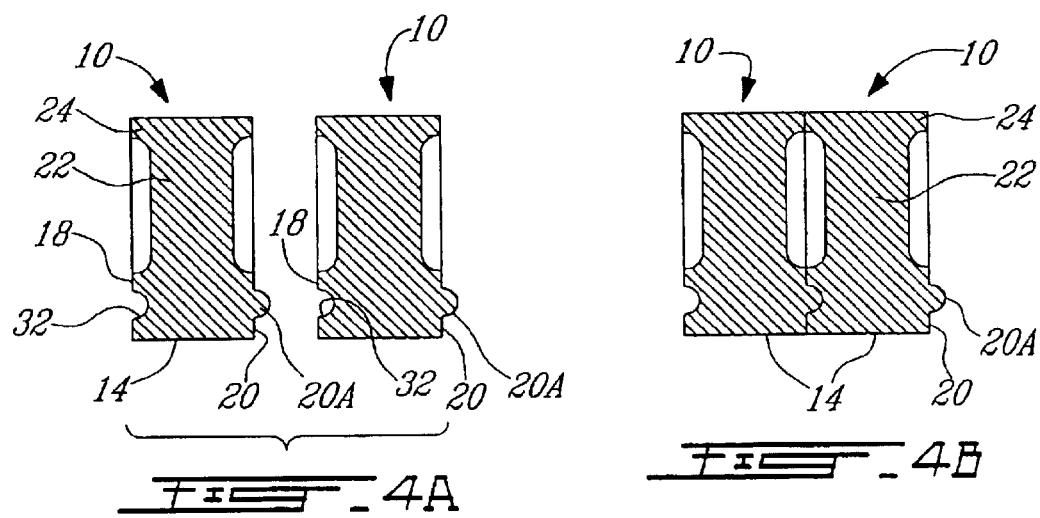
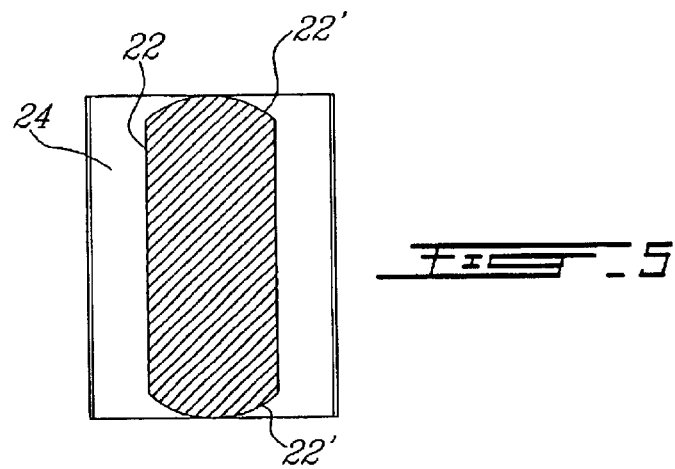
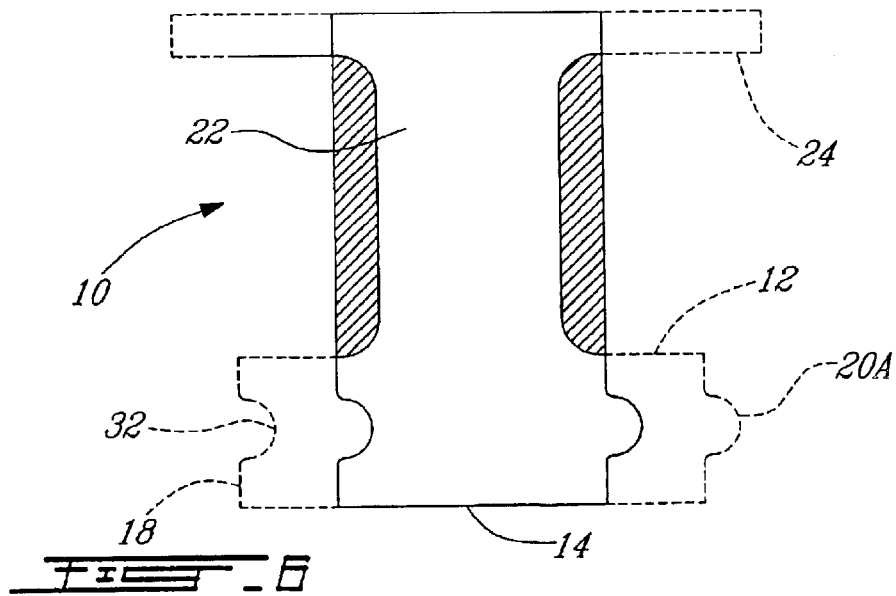

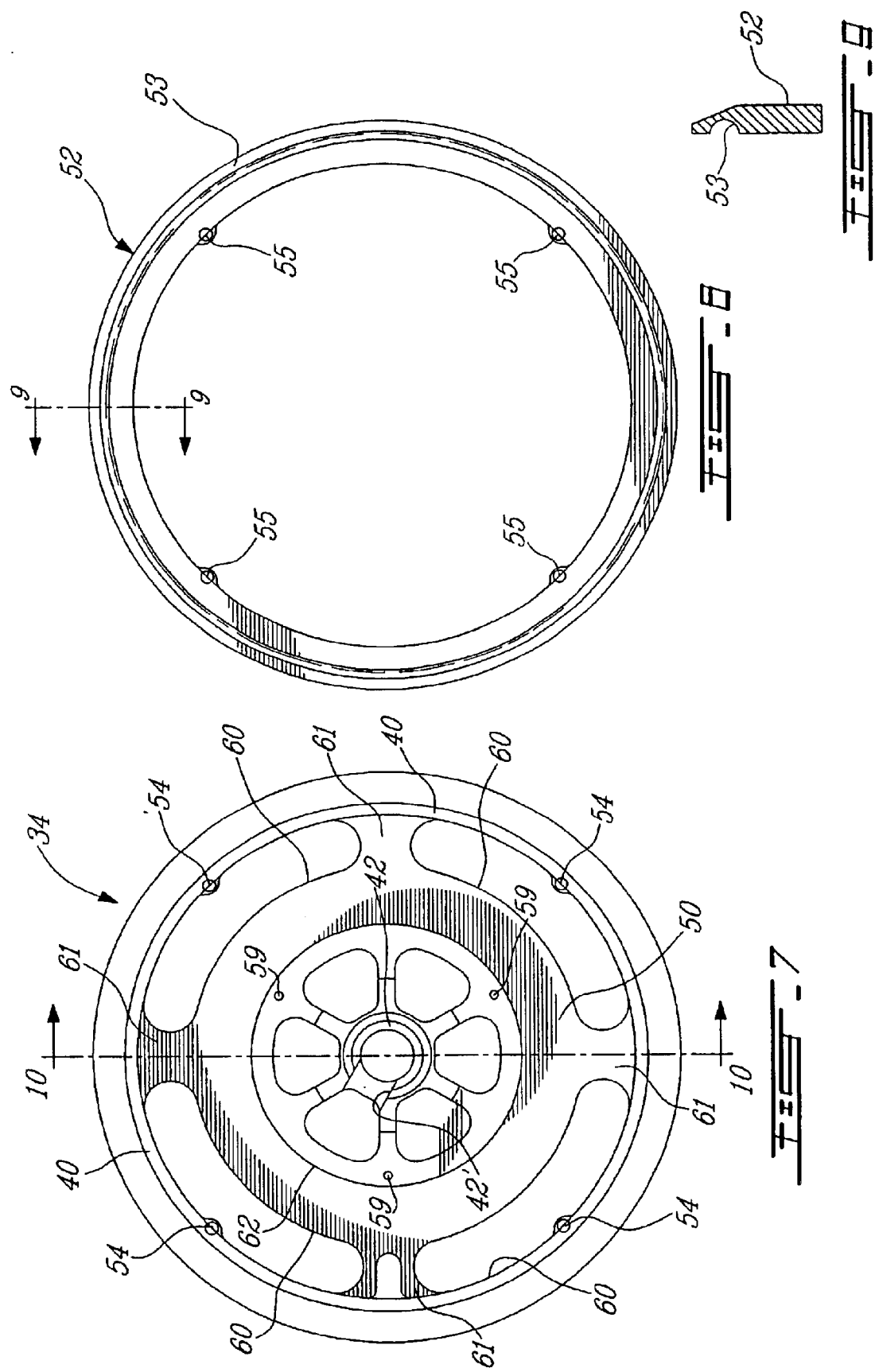

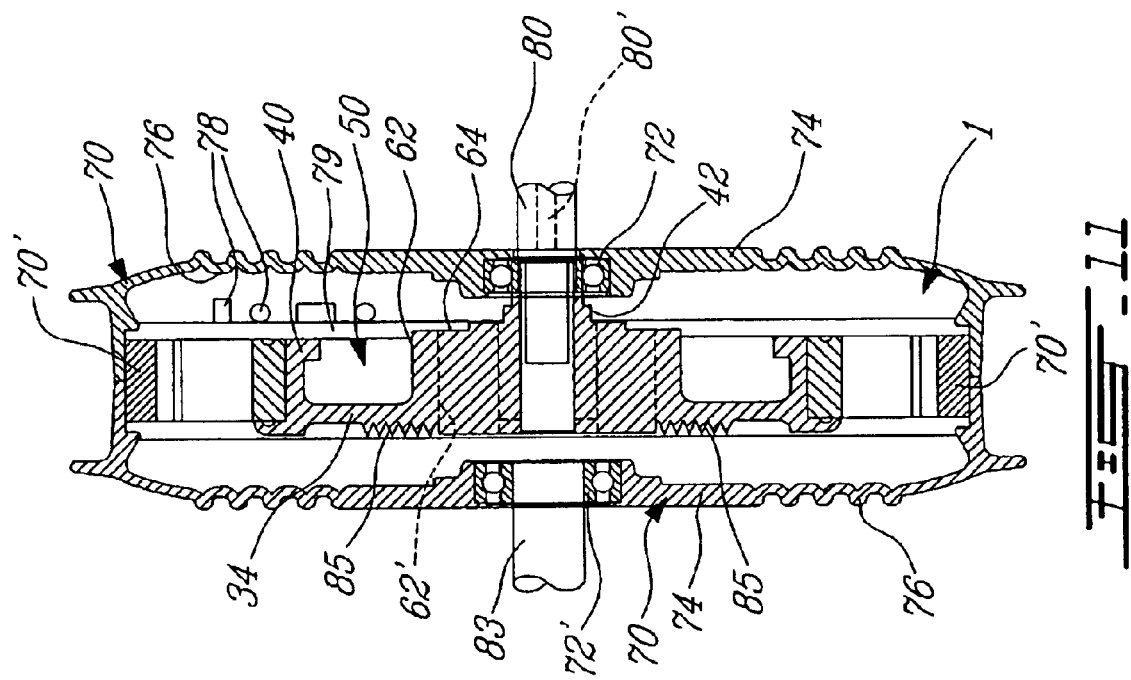
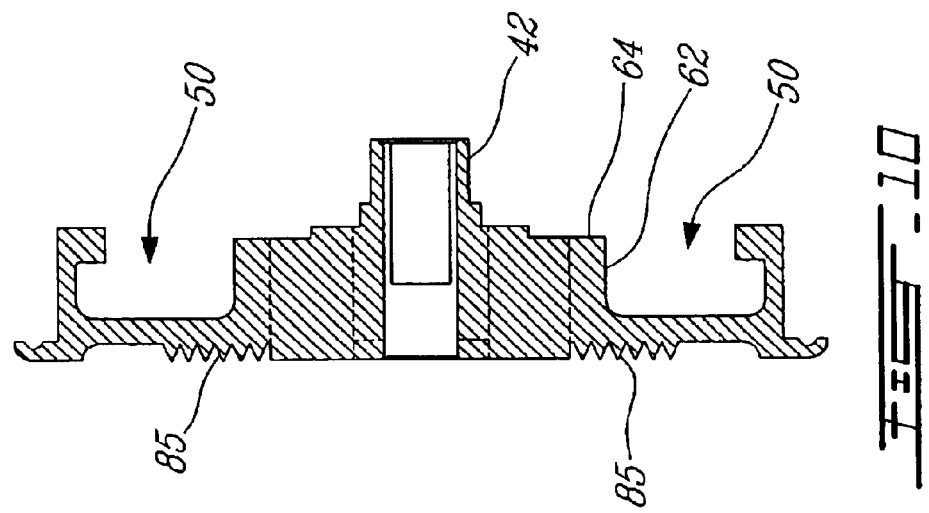

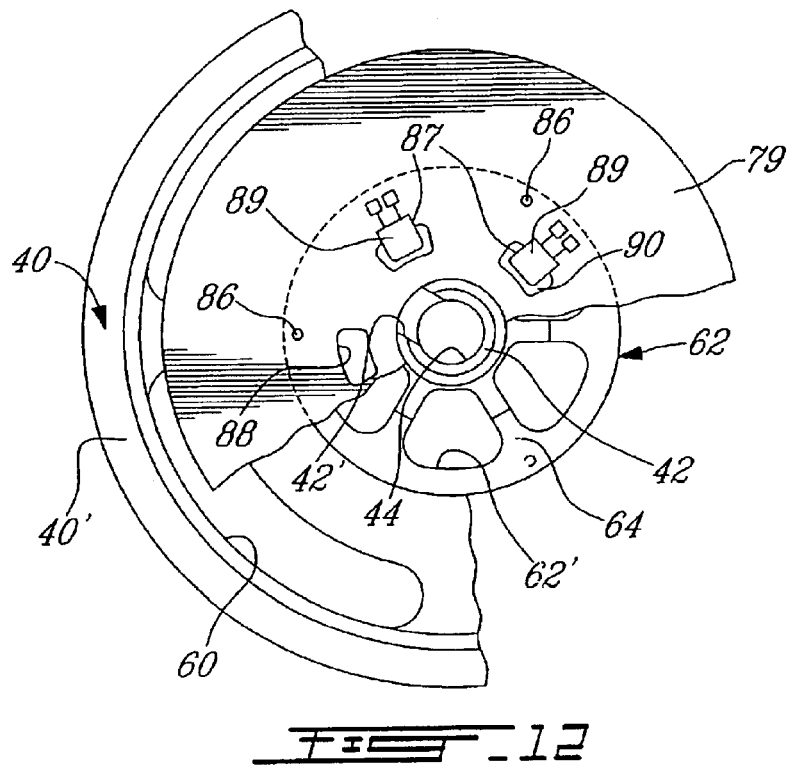
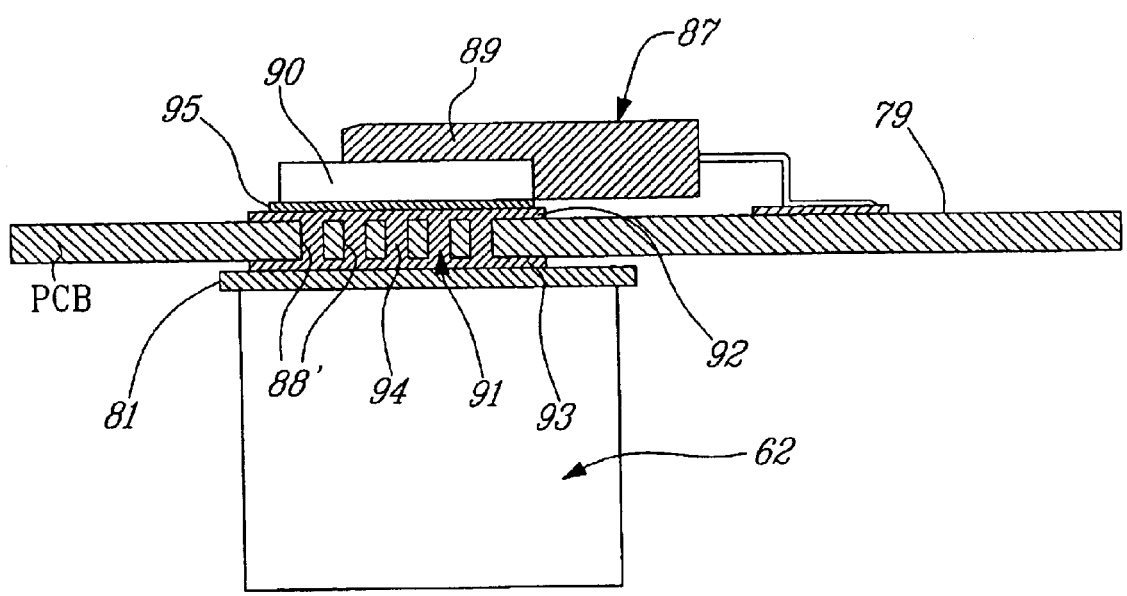

ELECTRIC MOTOR WITH MODULAR STATOR RING AND IMPROVED HEAT DISSIPATION

FIELD OF THE INVENTION

The present invention generally relates to improvements in electric motors to propel small vehicles, and more particularly, to a novel stator ring construction and heat dissipation structure for such motors.

BACKGROUND OF THE INVENTION

The use of electric motors as the motoring force and generator for many types of vehicles and devices is desirable as such are pollution free, very quiet in operation, light weight, and can be made compact. With such features, electric motors have progressively been given newer applications. For instance, two-wheel transportation devices such as bicycles, lawnmowers, mopeds, wheelchairs, scooters, and nautical transportation devices, such as personal watercrafts and small boats are all either known to have been propelled by electric motors or have the potential to be. Other applications may include, as examples, transportation devices for the physically challenged and wind turbines.

Electric power has emerged as a popular motoring force generator for some transportation vehicles as they may be recharged during use, whereby such vehicles can become autonomous for long distances. For instance, an electric motor mounted to a bicycle can act as a generator and may be recharged when the bike is going downhill, or when the motor is in a braking mode.

U.S. Pat. No. 6,093,985, issued to Chen on Jul. 25, 2000, discloses an electric motor adapted for powering a bicycle and which consists of a motor housing having a rotor portion mounted to the spokes of a bicycle. The housing and rotor assembly rotate about a mandrill upon which a stator portion is secured. The rotor is an annular wall provided with a magnet layer on its inner surface, whereas the stator comprises a plurality of silicone steel sheets having a coil circumferentially mounted thereon. When the coil is energized, the rotor portion is rotated, whereby the bicycle is driven forward.

In designing an electric motor for the above-described purpose, many considerations must be taken into account. For instance, the electric motor must be able to sustain varying temperatures as it is subject to heat generated from the coils and electronic components as the motor produces electricity. This temperature increase will create thermal expansion of the various pieces in the electric motor and expose electronic components housed with the motor casing to high heat. Therefore, electric motors must be adapted for sustaining thermal expansion of their components and provide excellent heat dissipation. In some applications, the electric motors must remain as light as possible, as the weight thereof is part of the load to be driven. This is especially important for touring applications, which involve peak demands of power, fast accelerations and sudden braking. Furthermore, the motor space is often limited, especially in motor applications where small size is important, such as for motoring bicycles. Finally, some of the above-described transportation devices are relatively inexpensive, and therefore the cost of the electric motor is an important factor to maintain the device price competitive. A good design for an electric motor adapted for touring applications is a compromise between lightweight and heat dissipation. Known electric motors of this type are also costly to assemble due to their complexity of construction and design.

Stators are typically constructed of steel sheet layering, which consists of a plurality of silicon iron sheets of a same shape being stacked and bonded together. Although such stators have high mechanical strength, as well as low electrical resistivity and high magnetic permeability, they are relatively expensive to produce and involve substantial losses of material (i.e., loss of material due to the plurality of layers). Furthermore, heat dissipation is not optimal for such stators, as the heat transfer between iron sheets is weak. Therefore, the heat dissipation of such stators is said to be two-dimensional. Similarly, as these stators consist of stacked sheets, only two-dimensional shapes may be defined. Therefore, these stators are not geometrically optimizeable and exhibit poor heat dissipation.

SUMMARY OF THE INVENTION

It is a feature of the present invention to provide a stator ring for an electric motor which substantially overcomes the above-described disadvantages of the prior art.

It is a further feature of the present invention to provide such a stator ring of lightweight construction.

It is a still further feature of the present invention to provide a stator ring for an electric motor capable of having its size varied for increasing its output.

A further feature of the present invention is to provide an electric motor housing design which improves heat dissipation during operation.

Still another feature of the present invention is to provide an electric motor housing design incorporating an electronic circuit board mounted for improved heat dissipation.

A still further feature of the present invention is to provide an electric motor housing design having a circuit board on which are mounted a plurality of mosfet components with the casing of the mosfets secured to a heat sink assembly.

A further feature of the present invention is to provide an electric motor which is easy to assemble at low cost.

According to the above feature of the present invention, and from a broad aspect thereof, the present invention provides a stator ring for an electric motor. The stator ring comprises plural stator ring sections being molded of electrically insulated ferromagnetic powder. The stator ring sections each have an arcuate shoe having at least two teeth projecting radially therefrom. The teeth are adapted for receiving coil windings. The stator ring sections are adapted for being retained end to end by a stator core to form a complete stator ring. The arcuate shoes of the stator ring sections create expansion gaps between opposite ends thereof when the stator core and the stator ring sections are subjected to heat expansion, to prevent damage of the stator ring due to the heat expansion.

According to a further broad aspect of the present invention there is provided an electric motor stator assembly which comprises a stator core having an internal housing defined between an outer cylindrical wall and an inner central hub. Support means is provided for supporting a stator ring having coil windings about the outer cylindrical wall. Passage means is formed between the central hub and the outer cylindrical wall for dissipating heat from the internal housing. Securing means is provided for securing an electronic circuit board having heat generating electronic components in the housing. Conduction means is provided to conduct heat directly from the housing to a support shaft assembly of a wheel of a vehicle being motorized by an electric motor incorporating the stator assembly.

According to a still further broad aspect of the present invention there is provided an electric motor stator assembly which comprises a stator core having an internal housing defined between an outer-cylindrical wall and an inner central hub. A stator ring, having coil windings, is supported about the outer cylindrical wall, Passage means is formed between the central and the outer cylindrical wall for dissipating heat from the internal housing. Securing means is provided for securing an electronic circuit board having heat generating electronic components in the housing. Heat sink means is secured through the circuit board and in contact with some of the electronic circuit components to conduct heat directly from the components to the stator core to non-electrically conductive insulating means.

BRIEF DESCRIPTION OF THE DRAWINGS

A preferred embodiment of the present invention will now be described in detail having reference to the accompanying drawings in which:

FIG. 1 is a perspective view of a modular stator ring section constructed in accordance with the present invention;

FIG. 2 is a perspective view, partly sectioned, of the construction of a stator core with heat sink and the modular stator ring of the present invention;

FIG. 4A is a cross-section view of two modular stator ring sections disposed side-by-side prior to being assembled together in a side-by-side relationship;

FIG. 4B is a cross-section view of the modular stator ring section of FIG. 4A as assembled for increasing the size of the stator;

FIG. 5 is a cross-section view taken along cross-section line 5—5 of FIG. 3A;

FIG. 6 is a cross-section view illustrating a varying shape of a stator tooth;

FIG. 7 is a side elevation view of the stator core constructed in accordance with the present invention;

FIG. 8 is a side elevation view of a lock ring in accordance with the present invention;

FIG. 9 is a cross-section view of the lock ring taken along cross-section line 9—9 of FIG. 8;

FIG. 10 is a cross-section view of the stator core taken along cross-sectional line 10—10 of FIG. 7;

FIG. 11 is a cross-section view of a motor with the stator wheel of the present invention;

FIG. 12 is a fragmented elevational view showing an electronic circuit board secured to the central hub of a stator core constructed in accordance with the present invention and wherein certain electronic circuit components are secured to heat sinks; and FIG. 13 is a cross-section view illustrating the construction of the circuit board and the construction of the heat sink.

DESCRIPTION OF PREFERRED EMBODIMENTS

Figure 3A:
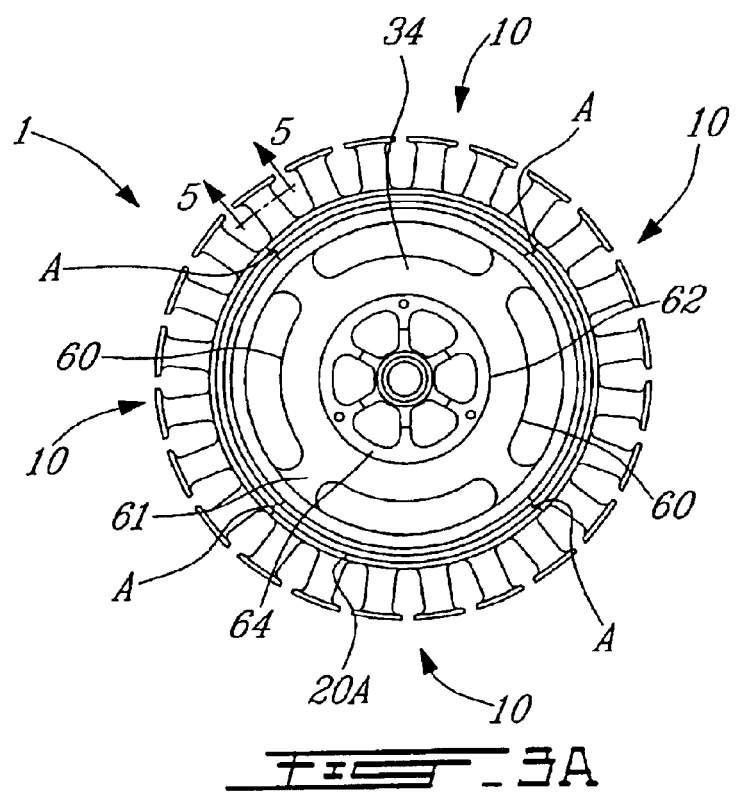
FIG. 3A is a side elevational view of a four-section modular stator ring and core constructed in accordance with the present invention and prior to thermal expansion.

According to the drawings and more particularly to FIG. 1, a modular stator ring section of the present invention is generally shown at 10. The modular stator ring section 10 is molded with metallic powder and has an arcuate shoe 12. The arcuate shoe 12 has an inner peripheral flat surface 14 and an outer peripheral flat surface 16, which are separated by edge walls 18 and 20 (see FIGS. 4A and 4B).

Figure 3B:
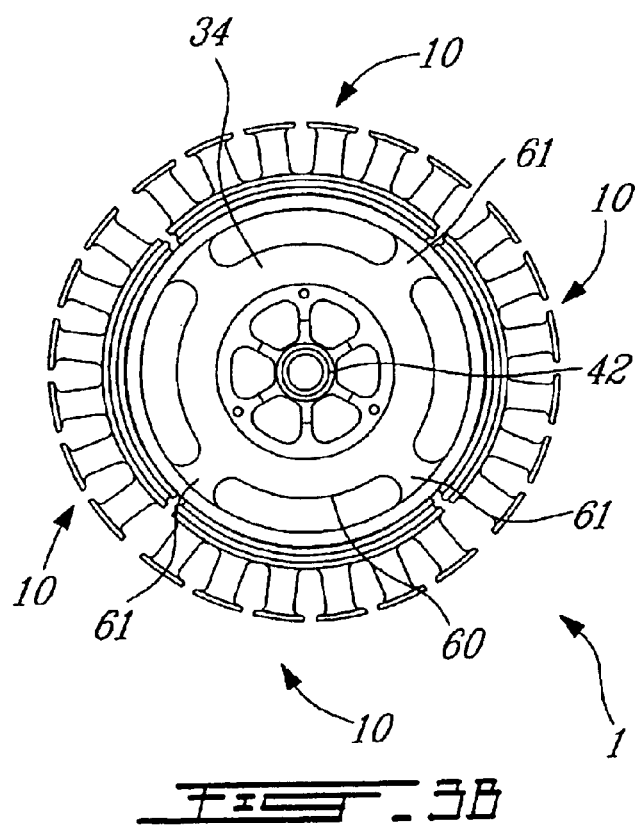
FIG. 3B is a view similar to FIG. 3A but illustrating the position of the stator ring sections after thermal expansion.

A plurality of teeth 22 (i.e., eight teeth in the stator ring section 10 of FIG. 1, whereas six teeth are illustrated in FIGS. 3A and 3B) project outwardly from the outer peripheral surface 16 of the arcuate shoe 12. Each tooth 22 has an outer plate 24 at a free end thereof. The teeth 22 are equidistantly spaced on the arcuate shoe 12 so as to define winding slots 26 therebetween. The outer plates 24 are slightly curved to define an outer curved surface for the outer periphery of the modular stator ring section 10, and this curved surface 24' is concentric with the inner surface 14 of the arcuate shoe 12 and dimensioned to be spaced closely to the rotor magnets as shown in FIG. 11.

A front projecting edge of the arcuate shoe 12 defines a projecting rib 28 having a curved end, whereas a rear end of the arcuate shoe 12 defines a corresponding concavely curved slot 30. The curved end of the rib 28 and the slot 30 are adapted for mating engagement when modular stator ring sections 10 are mounted end to end about the core 34 to form a stator ring thereabout.

As best seen in FIG. 3A, four modular stator ring sections 10 are mounted end to end about the core 34 in order to define a complete circular stator ring 1. The mating engagement of the stator ring sections 10 through their curved end edges 28 and slots 30 is illustrated at A at the junctions between adjacent arcuate shoes 12. According to various design considerations, e.g., size, weight and driving force required, the modular stator ring sections 10 may be comprised of varying numbers of teeth 22. For instance, the modular stator ring section of FIG. 1 comprises eight teeth 22, whereas the modular stator ring sections 10 of FIG. 3A each comprise six teeth and accordingly six coils wound thereabout (not shown). Furthermore, the arcuate shoe 12 may be curved to define various diameters of stator rings. This allows for varying dimensions of electric motors. There should be at least two modular stator ring sections 10 in a complete stator ring 1.

Returning to FIG. 1, the edge wall 18 of the arcuate shoe 12 has a slot 32 formed therein. As shown in FIG. 2, the modular stator ring section 10 is adapted, by means of the slot 32, to be mounted to the stator core 34. The stator core 34 is circular and has a flange 36 projecting radially therefrom. A support rib 38, of semi-circular cross-section, is circumferentially disposed on the inner surface of the flange 36 and is provided for mating engagement with the slot 32 of the modular stator ring section 10. The stator core 34 further comprises an annular collar 40 concentrically disposed and closely spaced adjacent the support rib 38 so as to define an abutment surface for the inner peripheral flat surface 14 of the shoe 12 of the modular stator ring section 10. It also defines the outer wall of the stator core housing 34'. FIG. 2 illustrates a pair of sectioned modular stator ring sections 10 matingly engaged about the semi-cylindrical support rib 38 of the stator core 34 and in abutment against the annular collar 40.

The stator core 34 further comprises a hub 42 having a hole 44 in the center thereof adapted for securement of the stator core 34 to a shaft 80 or mandrel as shown in FIG. 11. The stator core 34 is provided with through bores 62' and radiating ribs 62" to enhance heat dissipation and air convection thus constituting a heat sink. The stator portion of an electric motor is fixed, whereas the rotor portion rotates around the stator portion, as will be discussed later. For instance, the stator assembly consisting of the core 34 stator ring sections 10 may be secured to a shaft or mandrel of a bicycle so as to be stationary. The stator core 34 herein shown defines an annular cavity 50 adapted for receiving wires and electrical components of the electric motor, as will be described hereinafter. It is pointed out that various other configurations may be provided for the stator core 34.

As seen in FIG. 4A, the arcuate shoe 12 of the modular stator ring section 10 may be provided with an elongated side rib 20A, of semi-circular cross-section for instance, on the edge wall 20. As shown in FIGS. 7, 8 and 9, a lock ring 52 having a corresponding groove 53 is secured to the stator core 34, by fasteners received in threaded holes 54, in order to hold the modular stator ring sections 10 in place about the core 34. As seen in FIG. 8, the lock ring 52 has holes 55 placed so as to be opposite the threaded holes 54 in the core when the lock ring 52 is positioned so as to abut the top surface 40, of the collar 40 of the stator core 34. The groove 53, positioned on the periphery of the lock ring 52, is adapted for mating with the side ribs 20A of the stator ring sections 10, so as to lock them to the stator core 34. The mating between the ribs 20A and the groove 53 allows sliding displacement therebetween during thermal expansion. Therefore, the above-described method of mounting the modular stator ring sections 10 to the stator core 34 allows for the expansion of the stator ring 1 without having the modular stator ring sections 10 subjected to stress, thereby preventing damage (e.g., cracks) to the stator assembly and particularly the stator ring sections carrying the coils (not shown).

As seen in FIG. 3B, during thermal expansion of the stator assembly, an expansion gap A emerges between the modular stator ring sections 10. Previously, to reduce the risk of expansion damage, the stator core 34 and the modular stator ring sections 10 were built of the same material. Now with the present invention, the stator core 34 and the modular stator ring sections 10 may consist of different materials to make the assembly lighter. For instance, the stator core 34 is preferably made of a metal having a good thermal conductivity in order to act as a heat sink for the heat accumulated in the electrical motor. As copper windings and power components in the electric motor generate a lot of heat during operation, it is desirable to dissipate as much heat as possible to avoid damaging heat sensitive electronic components mounted within the annular cavity 50 of the stator core 34 by exercise internal heat in the core housing 34'. Because thermal expansion stress is prevented with the expansion gaps A design, aluminum is an advantageous material with its excellent thermal conductivity and its relative lightness, although it has a high expansion rate. Magnesium is another advantageous material for the construction of the stator core 34 as it is approximately one third lighter than aluminum. However, magnesium does not dissipate heat as well as aluminum.

With the increasing temperature in the electric motor, the aluminum stator core 34, which has a thermal expansion rate of approximately 23 mm per meter-° C., will not cause expansion stress on the modular stator ring sections 10 of the present invention, even though the latter are typically constructed of steel or iron, which have a rate of expansion which is about half as small as that of aluminum. As shown in FIG. 3B, the mating support rib 38 of the stator core 34 and slot 32 of the modular stator ring sections 10 allow for the modular stator ring sections 10 to be separated at their ends upon thermal expansion of the stator core 34. The thermal expansion of the stator core 34 creates the expansion gaps A between adjacent modular stator ring sections 10. This allows the use of materials providing better heat dissipation for the stator core 34 structure.

The modular stator ring section 10 is preferably produced with electrically insulated ferromagnetic powder. Iron powder molding minimizes material lost during the production of the stator sections 10. A further feature of the present invention is to provide the stator ring sections 10 with substantial reductions in the production cost. As mentioned above, the iron sheet layering construction of the known prior art stators is labour-costly. Therefore, the stator ring sections 10 are preferably molded of metal powder. The molding of metal powder into stator ring sections allows production of three-dimensional geometric shapes as opposed to the sheet-layering construction. Therefore, the molded stator ring sections may be geometrically optimized, as examples will show hereinafter. By forming the stator ring in sections, it is now only necessary to mold smaller parts and thereby requiring smaller presses and molds which are more readily available and this results in a cost saving.

One of the metal powders used for the molding of the modular stator ring sections comprises a portion of resin (e.g., 5% of resin) to enhance the bonding. The powder is fritted at temperatures ranging around 150° C., and at high pressure (i.e., 40 to 50 tons per square inch), to then be molded at ambient temperatures. Ejecting the pieces from the mold requires great forces, as the friction between the mold and the piece is high. Furthermore, complex geometrical shapes for modular stator ring sections involve a greater piece surface, whereby friction is increased. Therefore, the mold must be lubricated prior to the molding. A method for lubricating a mold well suited to the present invention is described in Canadian Patent Application No. 2,325,297, laid open on May 18, 2001. This method also helps preserve the mold by reducing the wear due to friction.

A further electrically insulated ferromagnetic powder used for the molding of the modular stator ring sections comprises a lubricant, which will ease the ejection from the mold. For such a powder, the piece is molded at room temperatures after being fritted at temperatures ranging between 300 and 350° C. The residues of lubricant in the molded piece allow the electrical insulation of the powder particles and enhance the mechanical cohesion. A vacuuming step in the molding allows the molded pieces to absorb a lacquer which will further bond the powder particles.

Another method for compensating for the high friction for the ejection of the pieces from the mold, is to have pieces having less surface (i.e., simpler shapes) and then to machine the pieces into the modular stator ring sections 10. This method, although straightforward, involves an increased amount of manpower.

Other advantages of the molding of the modular stator ring sections 10 result in minimizing of material losses as well as assembly time. Furthermore, the heat dissipation of the molded stator sections 10 is effected in three dimensions compared to the two dimensions of the laminate layers stator sections (i.e., the bonding between laminate layers prevents efficient heat sinking therebetween).

Referring to FIG. 5, a cross-section of one of the body of teeth 22 is shown having rounded edges 22'. These rounded edges 22' represent a third-dimension geometry, which is facilitated by the molding process. Thus, a copper coil typically wound about the teeth 22 is less likely to cut an insulating material layer disposed on the outer surface of the teeth 22. Furthermore, less copper is used in the winding about the teeth 22, as the rounded edges 22' reduce the outer surface of the teeth 22.

Referring to FIG. 6, the outer plate 24 is shown wider in phantom lines, as well as the arcuate shoe 12. This allows for a greater dissipation of heat and increases the peripheral area of the stator assembly, whereby magnetic flux is enhanced. It is once more pointed out that the iron powder molded stator sections present an easy manufacturing method which provides many benefits, such as the widening of the outer plate and the arcuate shoe.

Referring now to FIG. 4B, it is shown that the width of the stator wheel can be increased by stacking, side by side, modular stator ring sections 10. This is achieved by mating the rib 20A of a first stator section 10 to the adjacent slot 32 of an adjacent stator ring section 10 This provides a stator ring 1 having a greater output. The stator core 34 is designed to enhance the heat dissipation in order to increase the efficiency of the motor having the stator ring 1. As seen in FIGS. 3A, 3B and 7, arcuate slots 60 are provided behind the collar 40 for reducing the weight of the stator core 34 and to allow an air displacement when a rotor portion (as generally shown at 70 in FIG. 11) rotates about the stator wheel at the same time the motored vehicle is displaced and this creates an air current in the motor housing 34'. When the stator ring sections 10 are mounted to the stator core 34, the gaps A between the sections 10 are positioned in line with legs 61 separating the arcuate slots 60, as seen in FIGS. 3A and 3B. This ensures that thermal expansion of the stator core 34 will effectively create the gaps A rather than creating stress on the sections 10.

As shown in FIGS. 11 and 2, a central support hub portion 62 defines the cavity 50, and has a flat surface 64 adapted for receiving a disc-shaped electronic circuit board 79 incorporating the electronic circuitry 78 of the motor. The hub portion 62 has through bores 62' and ribs 62" in order to ensure an air circulation towards the electronic circuit board 79 for heat convection and dissipation or cooling of the electronic components 78. The through bores also reduce the weight of the stator core 34.

As shown in FIG. 13, the electronic circuit board 79 is separated from the hub portion 62 by a thermal mat 81 which insulates the board both thermally and electrically from the metal housing but which possesses good thermal conductivity. Threaded holes 59 are equidistantly spaced on the central support portion 62 in order for the electronic circuit board to be fastened thereto. Also, the hub 42 has a slot 42', as best seen in FIG. 7, to further enhance the heat dissipation. The hub 42 is adapted for receiving a bearing 72 on its outer diameter, for the rotation of the rotor portion 70 carrying the magnets 70' about the stator. A further bearing 72' is secured to a wheel hub 83 to permit the rotor housing 70 to rotate with a wheel of a vehicle (not shown). The hub 42 is mounted on a stationary shaft 80 provided with a bore 80' for the passage of wiring (not shown) connected to the circuit board 79. Of course, the circuit board 79 may have a suitable shape other than disc-shaped.

The stator ring 1 is configured to dissipate heat efficiently. The various holes and through bores and ribs in the stator ring 1 allow for an efficient air circulation in order to cool the electronic circuit board in the stator core housing 34'. Heat dissipation is achieved by ventilation, convection and radiation. A combination of the ventilation and convection liberates a good portion of the heat in the stator core. As seen in FIGS. 10 and 11, an outer wall portion of the stator core 34 is provided with rib sections 85 in order to increase the surface area for improving heat dissipation.

Referring to FIG. 11, the rotor housing 70 is formed of opposed walls 74 having ribbed portions 76 to further dissipate heat. Also, the inner surfaces of the walls 74 are painted black in order to absorb the heat within the motor housing. The outer surfaces of the walls 74 are of lighter colors, such as aluminum, whereby heat caused by solar light will be reflected.

Referring now to FIGS. 12 and 13 there is shown the electronic circuit board 79 secured to the central hub 62 by means of fasteners 86 which are in engagement with the threaded bores 59. The circuit board 79 includes several electronic components, only a few being shown herein and namely a plurality of mosfets 87 secured in a spaced apart manner along a circumferential axis of the circuit board disposed over the top surface 64 of the central hub 62. As hereinshown the electronic circuit board 79 is provided with through bores 88 which are aligned with the top surface 64 of the central hub 62 whereby to dissipate heat from the outer casing 89 of the mosfets 87 directly to the top surf ace 64 of the central hub by a heat sink assembly as described hereinbelow.

Referring additionally to FIG. 13 the heat sink assembly is better illustrated. As hereinshown the mosfets 87 have an outer metal casing 89 to which is secured a heat conducting tab 90 of metallic material. The through bore 88 is hereinshown as being formed of a plurality of slots 88' and a conductive element 91 is secured across the through bores 88'. This conductive element 91 is formed of copper material and has opposed top and bottom flat conductive surfaces 92 and 93 respectively and disposed over a respective one of opposed surfaces of the circuit board 79. An intermediate core portion 94 extends through the through bores 88' and formed integral with the opposed surfaces 92 and 93. The top conducting surface 92 is in contact with the heat conductive tab 90 through a tin toil material 95 to ensure thermal conductivity between the casing 89, the heat conductive tab 90, the tin foil 95 and the top conducting surface 92, the intermediate core 94 and the bottom conducting surface 93. This bottom conductive surface 93 is in flat contact with the non-electrically conductive insulating sheet 81 which in this particular application is a Chromerics T609 sheet™, The sheet 81 is in contact with the top flat surface 64 of the central hub 62. Accordingly, heat from the mosfets is convected directly into the central hub 62 in the shaft 80 of a wheel to which the electric motor of the present invention is connected to. The cavities or through bores 60 and 62' in the housing of the stator core provide good heat dissipation from its surrounding metal parts which are aluminum casted parts which has good heat conductivity. The heat sink ribs formed in the outer walls of the rotor as well as the rotor walls themselves act as heat dissipaters. It is also pointed out that the heat sink ribs 76 also form rib sections internally of these outer walls which also provides good heat conduction and internal turbulence. Further dissipation of the central hub is achieved by the ribs 85 formed on the back wall of the central hub casting, as illustrated in FIG. 11.

It is within the ambit of the present invention to cover any obvious modifications of the embodiments described herein, provided such modifications fall within the scope of the appended claims. As an example only, the electric motor/generator of the present invention can be integrated in the manufacture of automobile engine designs as a hybrid System to start the engine and thereby replace the known alternators and electric motors.

What is claimed is:

1. An electric motor stator assembly comprising a stator core having an internal housing defined between an outer cylindrical wall and an inner central hub, support means for supporting a stator ring, passage means formed between said central hub and said outer cylindrical wall for dissipating heat from said internal housing, securing means for securing an electronic circuit board having heat generating electronic components in said housing, and conduction means to conduct heat directly from said housing, to a support shaft assembly of a wheel of a vehicle being motorized by an electric motor incorporating said stator assembly.

2. A electric motor stator assembly as claimed in claim 1 wherein there is further provided additional passage means and radiating ribs to constitute a heat sink in said inner central hub surrounding a shaft receiving bore, said central hub having a flat top wall to which is secured said electronic circuit board.

3. An electric motor stator assembly as claimed in claim 2 wherein said passage means and additional passage means are through bores extending through said stator core.

4. An electric motor stator assembly as claimed in claim 2 wherein said securing means are threaded bores provided in said flat top wall of said inner central hub for receiving fasteners to secure said circuit board thereto, said circuit board being a circular circuit board projecting from said hub in free space to enhance heat dissipation.

5. An electric motor stator assembly as claimed in claim 1 wherein said conduction means is a through bore in said hub in contact with said support shaft assembly of a wheel of a vehicle.

6. An electric motor stator assembly as claimed in claim 1 wherein there is further provided heat sink means secured through said circuit board and in contact with some of said electronic circuit components to conduct heat directly from said some of said components to said central hub on which said circuit board is secured, and electrically insulating thermal conductive insulating material between said heat sink means and said central hub.

7. An electric motor stator assembly as claimed in claim 6 wherein said some of said electronic circuit components are mosfets, said heat sink means being metal components in contact with an outer metal casing of said mosfets and a flat top surface of said central hub.

8. An electric motor stator assembly as claimed in claim 1 wherein said stator core is secured in a casing having opposed spaced apart housing walls having inner surfaces coated with a black paint to absorb heat from the stator core assembly, said housing walls having outer surfaces of light color to reflect heat.

9. An electric motor stator assembly as claimed in claim 8 wherein said housing walls are further provided with circumferential ribbed sections whereby to absorb heat and to facilitate the dissipation of said absorbed heat through said housing walls.

10. An electric motor stator assembly comprising a stator core having an internal housing defined between an outer cylindrical wall and an inner central hub, a stator ring having coil windings supported about said outer cylindrical wall, passage means formed between said central hub and said outer cylindrical wall for dissipating heat from said internal housing, securing means for securing an electronic circuit board having heat generating electronic components in said housing, and heat sink means secured through said circuit board and in contact with some of said electronic circuit components to conduct heat directly from said some of said components to said stator core through non-electrically conductive insulating means.

11. An electric motor stator assembly as claimed in claim 10 wherein said electronic circuit board is secured to a flat top wall of said inner central hub by fastener means, said some of said electronic circuit components being mosfets, said heat sink means being metal components in contact with an outer metal casing of said mosfets and said flat top wall of said central hub through said non-electrically conductive insulating means.

12. An electric motor stator assembly as claimed in claim 11 wherein heat conducting tab is secured to said metal casing of said mosfets, said circuit board having through bores therein, said metal components including a conductive element having opposed top and bottom flat conductive surfaces disposed on a respective one of opposed surfaces of said circuit board and a conductive intermediate core extending through an associated one of said through bores, said top flat conductive surface being in contact with said flat tab, said bottom flat conductive surface being in contact with said non-electrically conductive insulating means disposed on said flat top wall of said central hub.

13. An electric motor stator assembly as claimed in claim 12 wherein said metal components further includes a tin foil disposed between said tab and said top flat conductive surface, said conductive element being a copper conductive element.

14. An electric motor stator assembly as claimed in claim 12 wherein said circuit board is a circular disc-shaped circuit board, said through bores being spaced apart on a circumferential axis disposed over and about said flat top wall of said central hub.

* * * * *